United States Patent

[11] 3,630,368

| [72] | Inventor | Sung Ki Lee<br>Niagara, N.Y. |
|---|---|---|
| [21] | Appl. No. | 48,938 |
| [22] | Filed | June 19, 1970 |
| [45] | Patented | Dec. 28, 1971 |
| [73] | Assignee | Hooker Chemicals Corporation<br>Niagara Falls, N.Y.<br>Continuation of application Ser. No.<br>786,950, Dec. 26, 1968, now abandoned.<br>This application June 19, 1970, Ser. No.<br>48,938 |

[54] CONTINUOUS SKIMMER APPARATUS
8 Claims, 3 Drawing Figs.

[52] U.S. Cl. .................................................. 210/181,
210/195, 210/197, 210/320, 210/521
[51] Int. Cl. ............................................. B01d 21/10
[50] Field of Search ........................................... 210/83, 84,
320, 336, 521, 522, 181, 195, 197

[56] References Cited
UNITED STATES PATENTS

| 1,641,843 | 9/1927 | Fisher................... | 210/320 X |
| 1,829,544 | 10/1931 | Schilling et al. ......... | 210/523 X |
| 2,140,289 | 12/1938 | Hurtt et al. ............. | 210/167 X |
| 2,468,864 | 5/1949 | Campbell................ | 210/537 X |
| 2,620,926 | 12/1952 | Helbig................... | 210/83 X |
| 2,771,086 | 11/1956 | Kearney................. | 134/111 X |
| 2,923,648 | 2/1960 | K'Burg.................. | 134/108 X |
| 3,085,948 | 4/1963 | Kearney................. | 134/108 X |
| 3,120,853 | 2/1964 | Kearney et al............ | 134/108 X |
| 3,144,872 | 8/1964 | Kearney................. | 134/107 X |
| 3,477,581 | 11/1969 | Stearns.................. | 210/195 |

Primary Examiner—John Adee
Attorneys—Peter F. Casella, James F. Mudd, Edward A. Meilman, Donald C. Studley and Richard P. Muller ABSTRACT: There is provided an apparatus for the continuous skimming of the interface of two phases therein comprising a housing having a bottom and at least one sidewall; weir means within said housing including one pair of overflow weir members of which the top of the first weir member is above the top of the second weir member; a first and a second outlet within said housing wherein said first outlet is in the upper region of said housing and said second outlet is in the lower region of said housing, and disposed such that said second weir member is between said first weir member and both said first and said second outlets; and a first inlet within said housing spaced apart from said first outlet and from said second outlet, and disposed such that said second weir member is between said first inlet and said first outlet.

CONTINUOUS SKIMMER APPARATUS

This application is a continuation of my prior copending case Ser. No. 786,950, filed Dec. 26, 1968, and now abandoned.

BACKGROUND OF THE INVENTION

Many coating processes require baths containing two or more distinct phases and the efficiency of these baths is often hindered by an accumulation of insoluble particles within each phase or at the interface of the phases. Many of the prior art apparatus have attempted to alleviate this situation by employing various mechanical skimming devices. An apparatus has now been devised which can eliminate the accumulation of insoluble particles without employing a mechanical or foreign skimming device. The present apparatus also can be adapted to provide continuous heating, filtering, and volume control of the phases within the apparatus.

It is the object of this invention to provide an apparatus for the continuous skimming of phases therein. It is also the object of this invention to provide an apparatus which provides continuous skimming of the phases therein without employing a mechanical or foreign skimming device. A further object of the invention is to provide a simple apparatus for the continuous skimming, filtering, heating and volume control of the phases therein. Other objects will become apparent to those skilled in the art from the following detailed description.

SUMMARY OF THE INVENTION

This invention relates to an apparatus for the automatic skimming of the interface of two phases therein. More particularly, this invention relates to an apparatus for the automatic skimming of the interface of two phases therein comprising a housing having a bottom and at least one side wall; weir means within said housing including one pair of overflow weir members of which the top of the first weir member is above the top of the second weir member; a first and a second outlet within said housing wherein said first outlet is in the upper region of said housing and said second outlet is in the lower region of said housing, and disposed such that said second weir member is between said first weir member and both said first and said second outlets; and a first inlet within said housing spaced apart from said first outlet and from said second outlet, and disposed such that said second weir member is between said first inlet and said first outlet. In one embodiment, the apparatus is adapted for the automatic skimming of two phases and in other embodiments the apparatus is adapted for the automatic skimming of three phases.

DESCRIPTION OF THE INVENTION

The FIGS. show a housing, generally denoted as 1, 101 and 201, having a bottom 2, 102, and 202, and at least one sidewall 3, 103, and 203. The FIGS. illustrate a housing 1, 101 and 201 having a rectangular shape and thereby four sidewalls. However, the housing can be circular and thereby have only one sidewall, or can be D-shaped thereby having two sidewalls, or triangular in shape thereby having three sidewalls, and the like.

Figure 1:
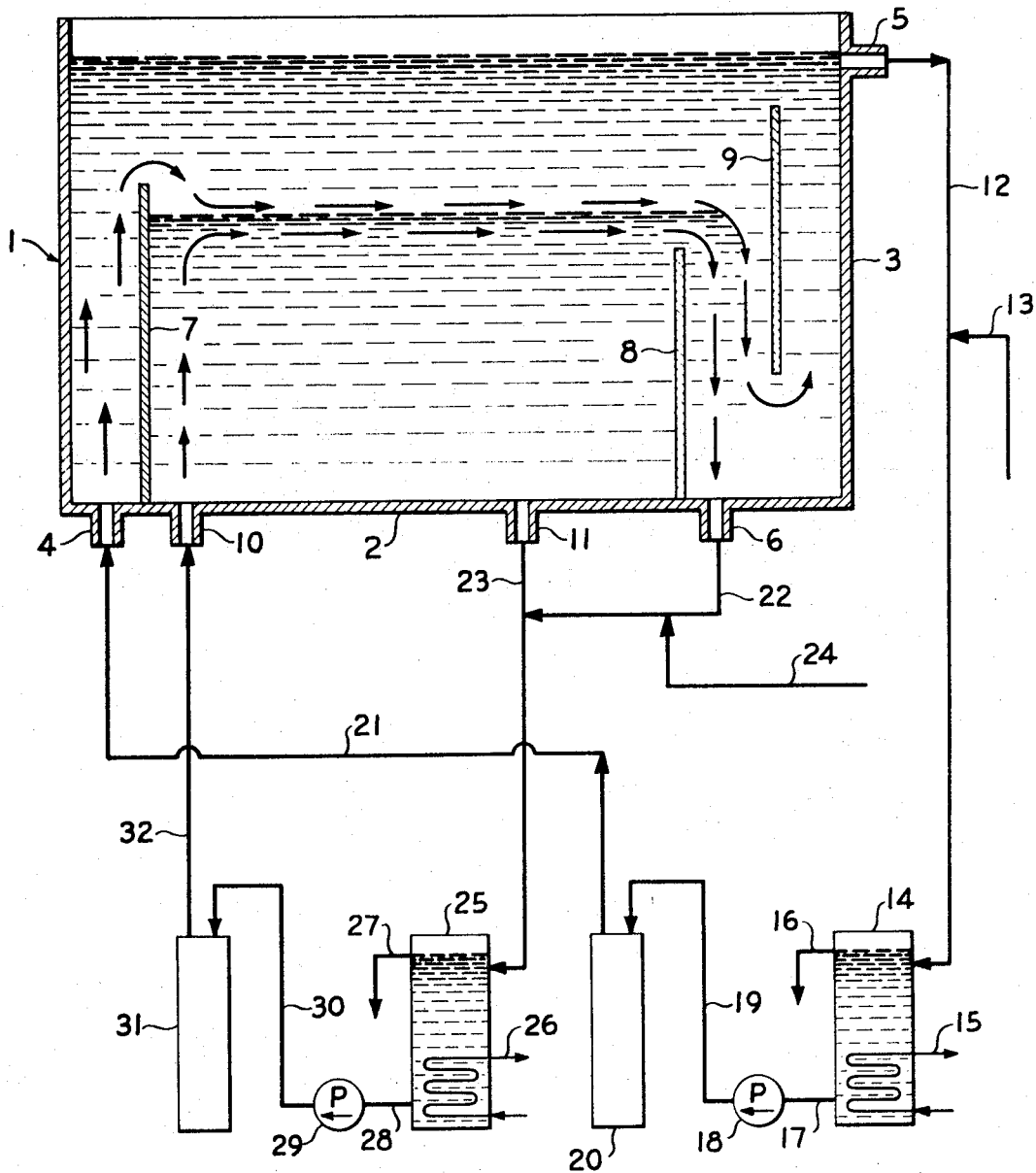
FIG. 1 is a schematic side view of one embodiment of the invention having provision for skimming the interface of two phases.

The apparatus illustrated in FIG. 1 contains an inlet 4 and two outlets 5 and 6 within housing 1. Outlets 5 and 6 are located in an area spaced apart (i.e., removed) from inlet 4 and outlet 5 is in the upper region of the housing while outlet 6 is in the lower region of the housing. The housing also contains a pair of weir members 7 and 8. Weir members 7 and 8 are overflow weir members, i.e., permitting fluid flow only over the top thereof, and the top of weir members 7 is above the top of weir member 8. The pair of weir members 7 and 8 are disposed such that weir member 8 is between weir member 7 and outlets 5 and 6.

The preferred embodiment illustrated in FIG. 1 contains additional structure. A weir means 9, which permits fluid flow over at least the top or the bottom thereof but not around the ends thereof, is located between weir member 8 and outlet 5. A second inlet 10 is located in the housing between the pair of overflow weir members 7 and 8. In the lower region of the housing between weir members 7 and 8 is located a third outlet 11. The weir means and members are preferably vertically disposed or substantially vertically disposed.

An illustration of the invention in practice will be described with reference to FIG. 1 wherein specific fluids will be described, but with no intention to limit the invention. Water enters housing 1 through inlet 4 and is directed in an upward fashion by weir member 7. As the water reaches the upper region of the housing 1, it flows toward weir member 8. A solution of white phosphorus in trichloroethylene enters housing 1 through inlet 10 and also flows in the direction of weir member 8. The volume of water and trichloroethylene solution and rate of entry into housing 1 is controlled such that the interface of these two phases is somewhat above the top or uppermost surface of overflow weir member 8. The fluids flowing over the top of weir member 8 are directed downward by weir means 9. Because water has the lower density, it will rise toward the upper region of the housing 1 and it is withdrawn through outlet 5 into an outlet pipe 12. A pipe 13 is connected with pipe 12 in order to supply fresh quantities of water. The water is transported in pipe 12 to reservoir 14 which can contain heating means, generally denoted as 15, and an overflow vent 16. The water is transported from reservoir 14 through a pipe 17, a pump 18 and a pipe 19 into a filter 20 wherein solid impurities are removed from the water. After filtration, the water is returned to inlet 4 through a pipe 21.

After flowing over weir member 8, the trichloroethylene will remain in the lower portion of housing 1 where it is withdrawn through outlet 6 into a pipe 22. Additional trichloroethylene solution is withdrawn through outlet 11 into a pipe 23 which is joined to pipe 22. Also joining pipe 22 is a pipe 24 through which fresh solution can be added. The trichloroethylene solution is transported to a reservoir 25 which can have a heating means, generally denoted as 26 and an overflow vent 27. Thereafter, the solution flows through a pipe 28, a pump 29 and a pipe 30 into a filter 31, wherein solid impurities are removed from the solution. After filtration, the trichloroethylene solution is returned to housing 1 through a pipe 32 connected to inlet 10.

By proper control of the volume and rate of flow of the water and trichloroethylene solutions, the two phases within housing 1 and the interface thereof will be continually withdrawn and subjected to continuous heating and purification. In this manner, the accumulation of insoluble particles within each phase and at the interface is avoided.

In employing the apparatus of this invention, an article is immersed in the water phase and thereafter in the trichloroethylene phase between weir members 7 and 8 and is then withdrawn.

Figure 2:
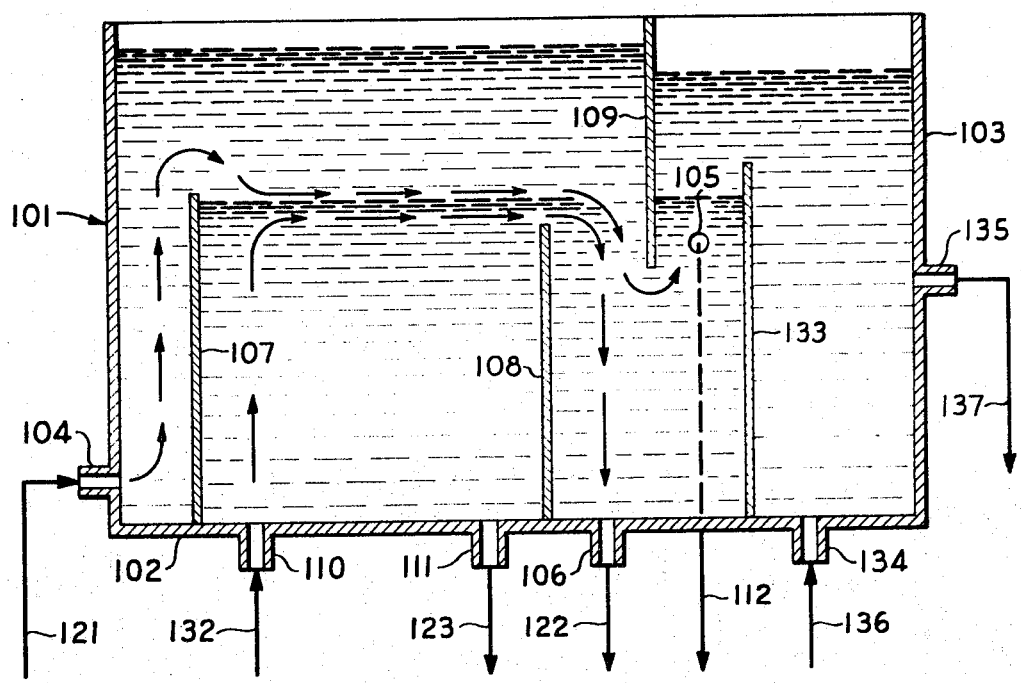
FIG. 2 is a schematic side view of another embodiment of the invention containing three phases and having provision for skimming the interface between two of the phases.

The embodiment illustrated by FIG. 2 is particularly useful where it is desired to employ three phases. The housing 101 contains two outlets 105 and 106 spaced apart from an inlet 104. Outlet 105 is in the upper region of the housing and outlet 106 is in the lower region of the housing. Located between inlet 104 and both outlets 105 and 106 is a pair of overflow weir members 107 and 108 of which the top of weir member 107 is above the top of weir member 108. The housing also contains a weir means 109 which is an underflow weir means, i.e., permitting fluid flow only under the bottom thereof, located between outlet 105 and weir member 108. A second inlet 110 is located in the housing between overflow weir members 107 and 108. In the lower region of the housing between overflow weir members 107 and 108 is located a third outlet 111. An overflow weir means 133 is disposed within housing 101 such that outlet 105 is between underflow weir means 109 and overflow weir means 133. An inlet 134 is located within the housing in the zone formed by underflow weir means 109 and a sidewall which contains overflow weir means 133. Also within that zone is an outlet 135.

In practice, the apparatus of FIG. 2 can be employed as follows. Water is transported into the housing through a pipe 121 connected to inlet 104 and flows over weir members 107 and 108 and is withdrawn through outlet 105 into a pipe 112. Trichloroethylene solution is introduced into the housing 101 through a pipe 132 connected to inlet 110, flows past overflow weir member 108 and is withdrawn through outlet 106 into a pipe 122. Additional trichloroethylene solution is withdrawn through outlet 111 into a pipe 123. Inlet 104 and outlet 105, and also inlet 110 and outlets 106 and 111, can be interconnected as described with reference to FIG. 1. Metal salt solution is introduced into the housing through a pipe 136 connected to inlet 134 and is withdrawn through outlet 135 into a pipe 137. Inlet 134 and outlet 135 can be interconnected through conduits as described hereinbefore.

In employing the apparatus of FIG. 2, an article is immersed in the water phase and thereafter in the trichloroethylene phase between overflow weir members 107 and 108 and is then withdrawn. The article can thereafter be immersed in the metal salt solution which is separated from the trichloroethylene solution by weir means 133. Alternatively, the article may be passed through the water layer into the trichloroethylene solution between overflow weir members 107 and 108 and thereafter follow a path which leads between weir member 108 and weir means 109 to between weir member 109 and weir means 113, over the top of weir means 133 and then be withdrawn.

Figure 3:
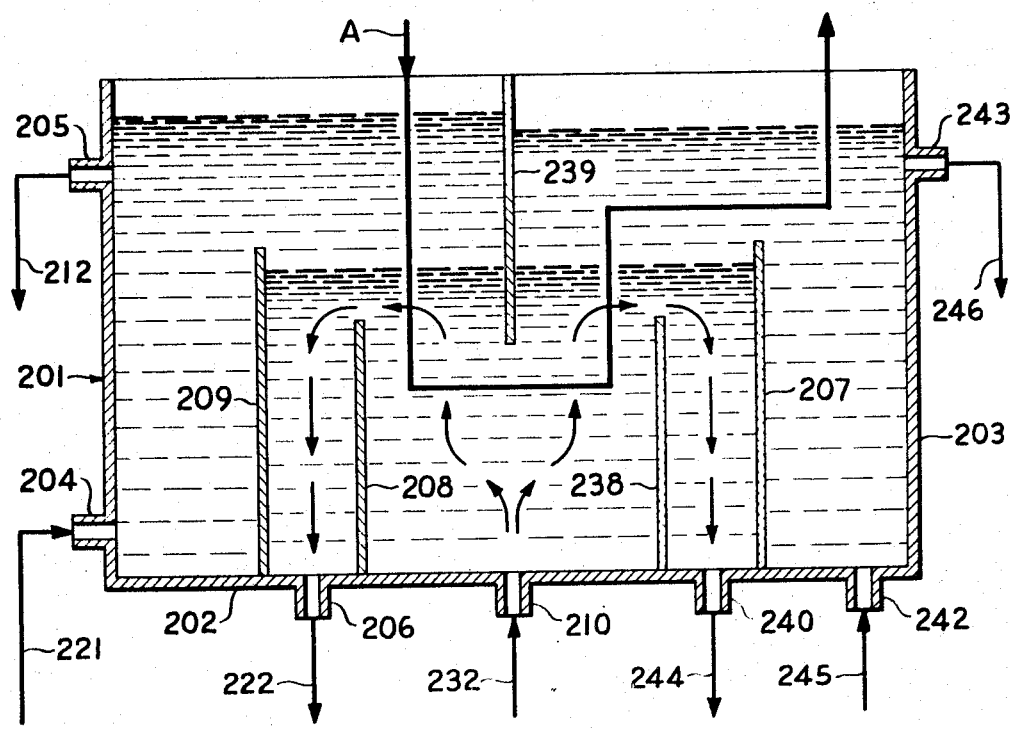
FIG. 3 is a schematic side view of another preferred embodiment of the invention having three phases therein and provision for skimming two interfaces.

The embodiment illustrated in FIG. 3 provides for the simultaneous skimming of two separate interfaces. Housing 201 contains an inlet 210 and two outlets 205 and 206 spaced apart therefrom. Outlet 205 is in the upper region of the housing and outlet 206 is in the lower region of the housing. Housing 201 contains a pair of overflow weir members 207 and 208 disposed such that inlet 210 lies between overflow weir members 207 and 208. Overflow weir member 208 is disposed such that it is between inlet 210 and outlet 205. The top of overflow weir member 207 is above the top of overflow weir member 208. Housing 201 contains an overflow weir means 209 which has a top above the top of overflow weir member 208, preferably of equal or substantially equal height as the top of weir member 107, and is disposed between outlets 205 and 206. Another overflow weir means 238, having a top of equal or substantially equal height as overflow weir member 208, is located between inlet 210 and overflow weir member 207. An underflow weir member 239 having a bottom below the top of overflow weir member 208 and overflow weir means 238 is located between overflow weir member 208 and overflow weir means 238. The housing 201 also contains a third outlet 240 between overflow weir member 207 and overflow weir means 238 in the lower region of the housing, an inlet 204 disposed in a first zone defined by underflow weir means 239 and a sidewall, a third inlet 242 in a second zone defined by underflow weir means 239 and a sidewall, and a fourth outlet 243 located in the upper region of the housing in said second zone.

In FIG. 3, the trichloroethylene solution is transported through a pipe 232 to inlet 210 where it enters housing 201. The solution flows over overflow weir member 208 and is withdrawn through outlet 206 into a pipe 222. Simultaneously, trichloroethylene solution flows over overflow weir means 238 and is withdrawn through outlet 240 into a pipe 244. Overflow weir member 207 and overflow weir means 209 serve to block the trichloroethylene solution from entering the remainder of the housing. Water enters housing 201 through a pipe 221 connected to inlet 204 and is withdrawn through outlet 205 which is connected to a pipe 212. Simultaneously, a metal salt solution is introduced into housing 201 through a pipe 245 connected to inlet 242 and is withdrawn through outlet 243 through a pipe 246. The water and metal salt phases are maintained distinct by underflow weir means 239. An article to be treated can be subject to phases within the apparatus of FIG. 3 by following the path denoted by the letter "A." The inlets and outlets for each phase can be joined by reservoirs, pumps, filters and the like as hereinbefore described.

The following examples serve to illustrate the invention but are not intended to limit it. For example, while the apparatus of the invention is particularly adapted to employ the systems described in my copending application Ser. No. 759,531, filed Sept. 28, 1967, and Ser. No. 750,487, filed Aug. 6, 1968, one skilled in the art will recognize that the apparatus can be adapted for employment with many other multiphase systems. The apparatus can also be employed as a liquid-liquid extractor. Unless otherwise specified in this specification and claims, all temperatures are in degrees centigrade and all parts are understood to be expressed in parts by weight.

EXAMPLE 1

The apparatus illustrated by FIG. 1 was employed. A 2 percent solution of white phosphorus in trichloroethylene was continuously introduced into housing 1 through inlet 10 and withdrawn through outlets 6 and 11 at a rate such that each unit of volume recirculated twice per minute. The trichloroethylene solution was maintained at 68° C. Water was introduced into housing 1 through inlet 4 and withdrawn through outlet 5 at a rate such that each unit of volume recirculated twice per minute. The water was maintained at a temperature of 60° C. A polypropylene sample was introduced into the apparatus in the area between weir members 7 and 8 and passed through the water layer into the trichloroethylene phase where it remained for 2 minutes. The polypropylene sample was withdrawn and immersed for 10 minutes in an ammoniacal solution of 5 percent nickel sulfate dissolved in water and maintained at a temperature of 65° C. The resulting plastic article was dried in an oven and thereafter subjected to conventional electroless metal plating with nickel and conventional semibright nickel electroplating. The resulting plated plastic article was found to have a very adherent metal coating on its surface. It was observed that the phases within the apparatus did not build up any accumulation of insoluble particles and the insoluble particles at the interface between the water and the trichloroethylene solution did not have an accumulation of insoluble particles because the particles formed were continually withdrawn through the various outlets.

EXAMPLE 2

The apparatus illustrated by FIG. 2 is employed. A 2 percent solution of white phosphorus in trichloroethylene containing 0.1 percent ethylene glycol is continuously introduced into housing 101 through inlet 110 and withdrawn through outlets 106 and 111 at a rate such that each unit of volume recirculated twice per minute. The trichloroethylene solution is maintained at 68° C. Water is introduced into housing 101 through inlet 104 and withdrawn through outlet 105 at a rate such that each unit of volume recirculated twice per minute. The water is maintained at a temperature of 60° C. An ammoniacal solution of 5 percent nickel sulfate dissolved in water containing 25 percent ethylene glycol and maintained at 65° C. is continuously introduced into housing 101 through inlet 134 and withdrawn through outlet 135 at a rate such that each unit of volume recirculated twice per minute. Polyethylene is introduced into the apparatus in the area between weir members 107 and 108 through the water layer into the trichloroethylene phase where it remains for 2 minutes. The plastic sample is thereafter transferred to the metal salt solution for 10 minutes. The resulting plastic article is dried in an oven, electroless metal plated with nickel and electroplated with semibright nickel. A very adherent metal coating is formed on the plastic article. The phases within the apparatus do not build up any accumulation of insoluble particles and the insoluble particles at the interface between the water and the trichloroethylene solution do not have an accumulation of insoluble particles because the particles formed are continually withdrawn through the various outlets.

EXAMPLE 3

In the apparatus illustrated by FIG. 3, a 2 percent solution of white phosphorus in trichloroethylene containing 0.5 percent of ethylene glycol was introduced into housing 201 through inlet 210 and withdrawn through outlets 206 and 240 at a rate such that each unit of volume recirculated twice per minute. Water was introduced into housing 201 through inlet 204 and withdrawn through outlet 205 at a rate such that each unit of volume recirculated twice per minute. An ammoniacal solution of 2.5 percent nickel sulfate hexahydrate containing 10 percent ethylene glycol was introduced into housing 201 through inlet 242 and withdrawn through outlet 243 at a rate such that each unit of volume recirculated twice per minute. A polypropylene sample was degreased by subjection for 2 minutes in 50° C. trichloroethylene. The sample was then passed through the water phase into the phosphorus phase which was being maintained at 55° C. After 5 minutes, the plastic was transferred to the metal salt phase, which had a temperature of 70° C. Upon removal from the nickel solution, the thus-treated plastic was dried, electroless nickel plated and electroplated with semibright nickel. The resulting polypropylene sample was found to have an adherent, metal coating on its surface. It was observed that the phases within the apparatus did not build up any accumulation of insoluble particles and the insoluble particles at the interface between the water and the trichloroethylene solution and between the trichloroethylene solution and the nickel sulfate solution did not have an accumulation of insoluble particles because the particles formed were continually withdrawn through the various outlets.

Various changes and modifications can be made in the apparatus of this invention without departing from the spirit and scope of the invention. The various embodiments of the invention disclosed herein serve to further illustrate the invention but are not intended to limit it.

I claim:

1. A self-skimming apparatus comprising:
   a housing having a bottom and at least one sidewall;
   weir means within said housing including one pair of overflow weir members permitting fluid flow only over the tops thereof, of which the top of the first weir member is above the top of the second weir member, said first and second weir members being positioned within said housing and with respect to each other such that the zone formed by said weir members in said housing is unobstructed, so as to permit free fluid flow between said weir members;
   a first and second outlet within said housing wherein said first outlet is in the upper region of said housing and said second outlet is in the lower region of said housing, and disposed such that said second weir member is between said first weir member and both of said first and second outlets;

2. The self-skimming apparatus of claim 1 having a third outlet in the lower region of the housing in the zone formed between said pair of overflow weir members, and wherein said first inlet and said first outlet are interconnected through conduits with the following: filtering means, pumping means, heating means and reservoir means; and wherein said second inlet and said second and third outlets are interconnected through conduits with the following: filtering means, pumping means, heating means and reservoir means.

3. The self-skimming apparatus of claim 2 having within the housing a weir means which permits fluid flow over at least the top or the bottom thereof but not past the ends thereof, disposed between said first outlet and said second weir member.

4. The self-skimming apparatus of claim 1 wherein said housing is rectangular having a bottom and four sidewalls.

5. The self-skimming apparatus of claim 3 wherein said housing is rectangular having a bottom and four sidewalls.

6. A self-skimming apparatus comprising:
   a rectangular housing having a bottom and four sidewalls;
   weir means within said housing including (1) one pair of overflow weir members of which the top of the first weir member is above the top of the second weir member, (2) a first overflow weir means having a top of equal height with said second weir member and disposed between said first weir member and said second weir member, (3) a second overflow weir means having a top above the top of said second weir member and disposed such that said second weir member is between said first weir means and said second weir means, and (4) an underflow weir means having a bottom extending downward to a point below the top of said second weir member and disposed between said first weir means and said second weir member;
   a first outlet within said housing disposed in the lower region of said housing in the zone between said first weir member and said first weir means;
   a second outlet within said housing disposed in the lower region of said housing in the zone between said second weir member and said second weir means;
   a first inlet within said housing disposed in the lower region of said housing in the zone between said first weir means and said second weir member;
   a third outlet disposed in the upper region of said housing and a second inlet within said housing disposed in a first zone formed by said underflow weir means and a sidewall; and
   a fourth outlet in the upper region of said housing and a third inlet within said housing disposed in a second zone formed by said underflow weir means and a sidewall.

7. The self-skimming apparatus of claim 6 wherein said third outlet is disposed in said first zone within a subzone defined by said first weir member and said sidewall, and wherein said fourth outlet is disposed in said second zone within a subzone defined by said second weir means and said sidewall.

8. The self-skimming apparatus of claim 7 wherein said first inlet and said first and second outlets are interconnected through conduits with the following: filtering means, pumping means, heating means and reservoir means; and wherein said second inlet and said third outlet are interconnected through conduits with the following: filtering means, pumping means, heating means and reservoir means; and wherein said third inlet and said fourth outlet are interconnected through conduits with the following: filtering means, pumping means, heating means and reservoir means.

* * * * *

PO-1050
(5/69)

UNITED STATES PATENT OFFICE
CERTIFICATE OF CORRECTION

Patent No. 3,630,368   Dated Dec. 28, 1971

Inventor(s) Sung Ki Lee

It is certified that error appears in the above-identified patent and that said Letters Patent are hereby corrected as shown below:

Column 5 line 59, after "outlets;" the following should be inserted:

---a first inlet in the lower region of said housing spaced apart from said first outlet and said second outlet, and disposed such that said second weir member is between said first inlet and said first outlet; and a second inlet in the lower region of said housing, in the zone formed between said first and second overflow weir members, and disposed such that said first weir member is between said first inlet and said second inlet.---

Signed and sealed this 30th day of May 1972.

(SEAL)
Attest:

EDWARD M. FLETCHER, JR.
Attesting Officer

ROBERT GOTTSCHALK
Commissioner of Patents